(12) United States Patent
Hu

(10) Patent No.: US 6,757,291 B1
(45) Date of Patent: Jun. 29, 2004

(54) SYSTEM FOR BYPASSING A SERVER TO ACHIEVE HIGHER THROUGHPUT BETWEEN DATA NETWORK AND DATA STORAGE SYSTEM

(75) Inventor: Lee Chuan Hu, Yorba Linda, CA (US)

(73) Assignee: Simpletech, Inc., Santa Ana, CA (US)

( * ) Notice: Subject to any disclaimer, the term of this patent is extended or adjusted under 35 U.S.C. 154(b) by 0 days.

(21) Appl. No.: 09/501,189

(22) Filed: Feb. 10, 2000

(51) Int. Cl.⁷ .................................................. H04J 3/02
(52) U.S. Cl. ...................... 370/401; 370/230; 370/235; 370/389; 370/395.52
(58) Field of Search ................................ 370/229, 230, 370/231, 235, 236, 237, 238, 389, 394, 395, 396, 397, 401, 402, 403, 395.1, 395.2, 395.3, 395.31, 395.52, 395.7, 395.71

(56) References Cited

U.S. PATENT DOCUMENTS

| | | | |
|---|---|---|---|
| 4,004,277 A | | 1/1977 | Gavril |
| 4,246,637 A | | 1/1981 | Brown et al. |
| 4,503,497 A | | 3/1985 | Krygowski et al. |
| 4,682,304 A | | 7/1987 | Tierney |
| 4,688,166 A | | 8/1987 | Schneider |
| 5,131,081 A | | 7/1992 | MacKenna et al. |
| 5,163,131 A | | 11/1992 | Row |
| 5,404,527 A | * | 4/1995 | Irwin et al. ................ 395/700 |
| 5,408,465 A | | 4/1995 | Gusella et al. |
| 5,630,067 A | | 5/1997 | Kindell et al. |
| 5,715,453 A | * | 2/1998 | Stewart ...................... 395/615 |
| 5,737,549 A | * | 4/1998 | Hersch et al. .............. 395/309 |
| 5,742,759 A | * | 4/1998 | Nessett et al. ......... 395/187.01 |

(List continued on next page.)

FOREIGN PATENT DOCUMENTS

| | | |
|---|---|---|
| WO | WO 99/46671 | 9/1999 |

OTHER PUBLICATIONS

Todd Spangler, "Intel's Newest E–Idea: A Smart XML Switch," http://www.zdnet.com/intweek/stories/news/0, 4164,2563309,00.html, web site printout dated May 8, 2000.

(List continued on next page.)

*Primary Examiner*—Dang Ton
*Assistant Examiner*—Shick Hom
(74) *Attorney, Agent, or Firm*—Knobbe, Martens, Olson & Bear, LLP

(57) ABSTRACT

A networked system is described in which the majority of data bypass the server(s). This design improves the end-to-end performance of network access by achieving higher throughput between the network and storage system, improving reliability of the system, yet retaining the security, flexibility, and services that a server-based system provides. The apparatus that provides this improvement consists of a network interface, server computer interface, and storage interface. It also has a switching element and a high-layer protocol decoding and control unit. Incoming traffic (either from the network or storage system) is decoded and compared against a routing table. If there is a matching entry, it will be routed, according to the information to the network, the storage interface, or sent to the server for further processing (default). The routing table entries are set up by the server based on the nature of the applications when an application or user request initially comes in. Subsequently, barring any changes or errors, there will be no data exchange between the server and the device (although, a control message may still flow between them). There may also be a speed matching function between the network and storage, load balancing function for servers, and flow control for priority and QoS purposes. Because the majority of data traffic will bypass the bus and the operating system (OS) of the server(s), the reliability and throughput can also be significantly improved. Therefore, for a given capacity of a server, much more data traffic can be handled.

22 Claims, 7 Drawing Sheets

Block Function Diagram

U.S. PATENT DOCUMENTS

| | | |
|---|---|---|
| 5,802,366 A | 9/1998 | Row et al. |
| 5,867,733 A | 2/1999 | Meyer |
| 5,892,913 A | 4/1999 | Adiga et al. |
| 5,913,028 A | 6/1999 | Wang et al. |
| 5,931,918 A | 8/1999 | Row et al. |
| 5,941,969 A | 8/1999 | Ram et al. |
| 5,950,203 A | 9/1999 | Stakius et al. |
| 6,014,692 A | 1/2000 | Kelley et al. |
| 6,055,577 A | 4/2000 | Lee et al. |
| 6,069,895 A | 5/2000 | Ayandeh |
| 6,081,883 A | 6/2000 | Popelka et al. |
| 6,097,955 A | 8/2000 | Bhat |
| 6,195,703 B1 | 2/2001 | Blumenau et al. |
| 6,226,680 B1 | 5/2001 | Boucher et al. ............ 709/230 |
| 6,226,684 B1 | 5/2001 | Sung et al. |
| 6,243,737 B1 | 6/2001 | Flanagan et al. |
| 6,249,294 B1 | 6/2001 | Lefebvre et al. |
| 6,253,271 B1 | 6/2001 | Ram et al. |
| 6,260,040 B1 | 7/2001 | Kauffman et al. |
| 6,269,410 B1 | 7/2001 | Spasojevic |
| 6,324,581 B1 | 11/2001 | Xu et al. |
| 6,389,479 B1 | 5/2002 | Boucher et al. ............ 709/243 |
| 6,427,173 B1 | 7/2002 | Boucher et al. ............ 709/238 |
| 6,430,570 B1 | 8/2002 | Judge et al. ................ 707/102 |
| 6,434,620 B1 | 8/2002 | Boucher et al. ............ 709/230 |
| 2001/0016878 A1 | 8/2001 | Yamanaka |
| 2001/0039586 A1 | 11/2001 | Primak et al. |
| 2002/0073218 A1 | 6/2002 | Aspromonte et al. ....... 709/231 |
| 2002/0087732 A1 | 7/2002 | Boucher et al. ............ 709/250 |
| 2002/0107989 A1 | 8/2002 | Johnson et al. ............. 709/250 |

OTHER PUBLICATIONS

International Search Report for International Application No. PCT/US01/00688.

International Preliminary Examination Report for International Application No. PCT/US01/00688.

* cited by examiner

Top Level Function Diagram

*FIG. 2*  Block Function Diagram

An Example of Ethernet, SCSI, and PCI Interfaces for http Applications

Traffic Flow from Network to Storage and Server

Traffic Flow from Storage to Network and Server

FIG. 6

| Enet hdr | ... | IP hdr | ... | TCP hdr | ... | http hdr | ... | html payload |
|---|---|---|---|---|---|---|---|---|

Information Interested in a Packet

FIG. 7

Expanded Routing Table (ERT)

| SrcID | DestID | SessionID | Outgoing PortID | Priority | Type | segment size (x base) |
|---|---|---|---|---|---|---|
| A | B | N1 | 2 | 1 | Real-time | 2 |
| A1 | B | N2 | 1 | 1 | Non-real-time | 3 |
| A2 | S | N3 | 3 | 2 | Local | 1 |

Example of Expanded Routing Table

An Example of Concurrently Pipelined Network User Request for Web Access

SYSTEM FOR BYPASSING A SERVER TO ACHIEVE HIGHER THROUGHPUT BETWEEN DATA NETWORK AND DATA STORAGE SYSTEM

BACKGROUND OF THE INVENTION

1. Field of the Invention

The present invention relates to computer networks, client/server based computing, and data storage (or storage network). More particularly, this invention relates to network management, performance enhancement and reliability improvement for network data access through servers.

2. Prior Art

The following definitions will be useful in discussing the prior art in this field, and how the present invention overcomes the limitations of the prior art:

"Server": a computer system that controls data access and data flow to serve the requests from a user computer (client) connected through network(s).

"Server-oriented": Refers to data that requires significant computation or processing, that usually is carried out by a server CPU. The examples are network user login processes going through authorization, authentication and accounting (AAA).

"Storage-oriented": Simple storage access such as disk read and/or write is considered storage-oriented. Most operations are data fetching and transport without the involvement of CPU. JPEG and MPEG file transport are examples of storage-oriented data.

In the current server-based Internet infrastructure, for an end user to access data from a remote website, the following sequence of events will occur: First, the request packets from the user computer have to travel to a remote network access point via a wide area network (WAN), through the network gateway at the remote web system, and then to a server in the web system. Second, the server processes the request and sends a command to a storage device to fetch the requested data, the data travels from the device back to the server, and traverses path back to the user computer. In this end-to-end set-up, a server is situated between the data sources and the user and is often the limiting element of the entire data access operation. Such a configuration may cause server(s) to become a major bottleneck between the clients (or network end users) and their requested data on storage devices. Both data and control traffic must pass through the server(s) twice.

Most current network systems are constructed with this architecture. Although a server system here can be a server clustering or load-balanced server farm, the fundamental problems in content delivery through server(s) do not change. The main advantages of current systems are their flexibility and security. The server system has control over all the traffic flows. However, this architecture also comes with a number of disadvantages: server bus contention (in many cases, a PCI bus), server OS inefficiency in high-speed context switching (e.g., costly interrupt handling), and multiple data copying.

Server system bus contention causes two problems for networks. Since each peripheral component must contend for the bus usage without any guarantee of bandwidth latency and time of usage, the user data throughput varies, and the latency for data transfer cannot be bounded.

The server OS inefficiency puts a heavy toll on the network through-put. In particular, an interrupt causes two context switching operations on a server. Context switching is an OS process in which the operating system suspends its current activity, saves the information required to resume the activity later and shifts to execute a new process. Once the new process is completed or suspended, a second context switching occurs during which the OS recovers its previous state and resumes processing. Each context switch represents an undesirable loss of effective CPU utilization for the task and network throughput. For example, a server handles thousands of requests and data switches at high speed. Further, heavy loading and extensive context-switching can cause a server to crash. A small loss of data can cause TCP to retransmit, and retransmissions will cause more interrupts which in turn may cause more OS crashes. The OS interrupt-induced stability problem is very acute in a web hosting system where millions of hits can be received within a short period of time.

Multiple data copying is a problem (also known as "double copy") for normal server operations. According to the current architecture, data received from the storage (or network) have to be copied to the host memory before they are forwarded to the network (or storage). Depending on the design of the storage/network interface and the OS, data could be copied more than two times between their reception and departure at the server, despite the fact that the server CPU does not perform many meaningful functions other than verifying data integrity. Multiple data-copying problem represents a very wasteful usage of the CPU resources. When this is coupled with the OS inefficiency, it also represents a significant degradation of QoS (Quality of Service) for the data transfer.

The current solutions to server bottlenecks have involved two different approaches: improving the network performance and improving the storage performance.

From the storage approach, SAN (Storage Area Network) and NAS (Network Attached Storage) represent large current efforts. Another solution is to replace the server bus with a serial I/O architecture (the InfiniBand architecture, which is under development).

An NAS is a specialized server for storage file services. The specialized server is connected to a network. The major disadvantages are the lack of the flexibility that general servers have, and its need to communicate with other servers. An NAS can be used in secured environments like an internal LAN or SAN. Authorization, account, and authentication (AAA) and firewall are unlikely to be performed by an NAS, since an overly complicated function is not easily implemented in such a system. Furthermore, it is not easy to upgrade software or protocols under the specialized design of NAS.

SAN is an architecture for storage systems with the advantages of flexibility and scalability. While NAS is limited due to its network interface, SAN defines an environment dedicated to storage without worrying about security or other heterogeneous design concerns. Servers (which are more versatile) are still needed to connect the SAN to outside network. Therefore, the server bottleneck is still present. Furthermore, access control and other server functions are not specified in SAN systems, so other components must be added for full functionality.

From the network approach, two techniques have been devised: Web Switching and Intelligent Network Interface. Among the goals of web switching is load balancing servers in a web hosting system. While web switching has many platforms, the basic approach is to capture the IP packets and use the information they contain in the layers 4 through 7 to switch the traffic to the most suitable servers, thus keeping the servers with balanced load. This approach does not address the problems of multiple data copying and server system bus contention. The server OS inefficiency problem is only indirectly addressed.

In the Intelligent Network Interface approach, functionalities are added to the NIC (Network Interface Card) that reduce server interrupts by batch processing. This approach does not address the Server system bus contention problem directly, and as a result, the latency of data transfer is still unbounded and data transfer throughput is still not guaranteed. In addition, this approach only reduces switching overhead but does not address the multiple data-copying problem.

BRIEF SUMMARY OF THE INVENTION

Objects of the invention include the following:
1. To increase the network and storage access performance and throughput.
2. To reduce traffic delay and loss between network(s) and storage due to server congestion or to bound the latency for real-time streamings (QoS improvement).
3. To increase server and network system, availability, reliability and reduce server system failures by reducing the traffic going through the server bus, OS and CPU.
4. To maintain the flexibility of a server-based system (vs. a network attached storage or NAS).
5. To be scalable and reduce the total system cost.

In sum, the invention aims to provide highest levels of server-based Reliability, Availability and Scalability (RAS) for a network system and highest levels of QoS for the end users.

These and other objects of the invention are achieved in a networked system by introducing apparatus that causes the majority of data to bypass the server(s). This design improves the end-to-end performance of network access by achieving higher throughput between the network and storage system, improving reliability of the system, yet retaining the security, flexibility, and services that a server-based system provides. The apparatus that provides this improvement logically consists of a network interface, server computer interface, and storage interface. It also has a switching element and a high-layer protocol decoding and control unit. Incoming traffic (either from the network or storage system) is decoded and compared against a routing table. If there is a matching entry, it will be routed, according to the information, to the network, the storage interface, or sent to the server for further processing (default). The routing table entries are set up by the server based on the nature of the applications when an application or user request initially comes in. Subsequently, barring any changes or errors, there will be no data exchange between the server and the device (although, a control message may still flow between them). There may also be a speed matching function between the network and storage, load balancing functions for servers, and flow control for priority and QoS purposes. Because the majority of data traffic will bypass the bus and the operating system (OS) of the server(s), the reliability and throughput can be significantly improved. Therefore, for a given capacity of a server, much more data traffic can be handled, thus making the system more scalable.

BRIEF DESCRIPTION OF THE DRAWINGS

FIG. 6 is a depiction of information decoded in various layers of protocols.

FIG. 7 shows an example of the Expanded Routing Table (ERT) with assumed contents.

DETAILED DESCRIPTION OF THE PREFERRED EMBODIMENTS

The preferred embodiment of the invention is illustrated in FIGS. 1–8, and described in the text that follows. Although the invention has been most specifically illustrated with particular preferred embodiments, it should be understood that the invention concerns the principles by which such embodiments may be constructed and operated, and is by no means limited to the specific configurations shown.

Figure 1:
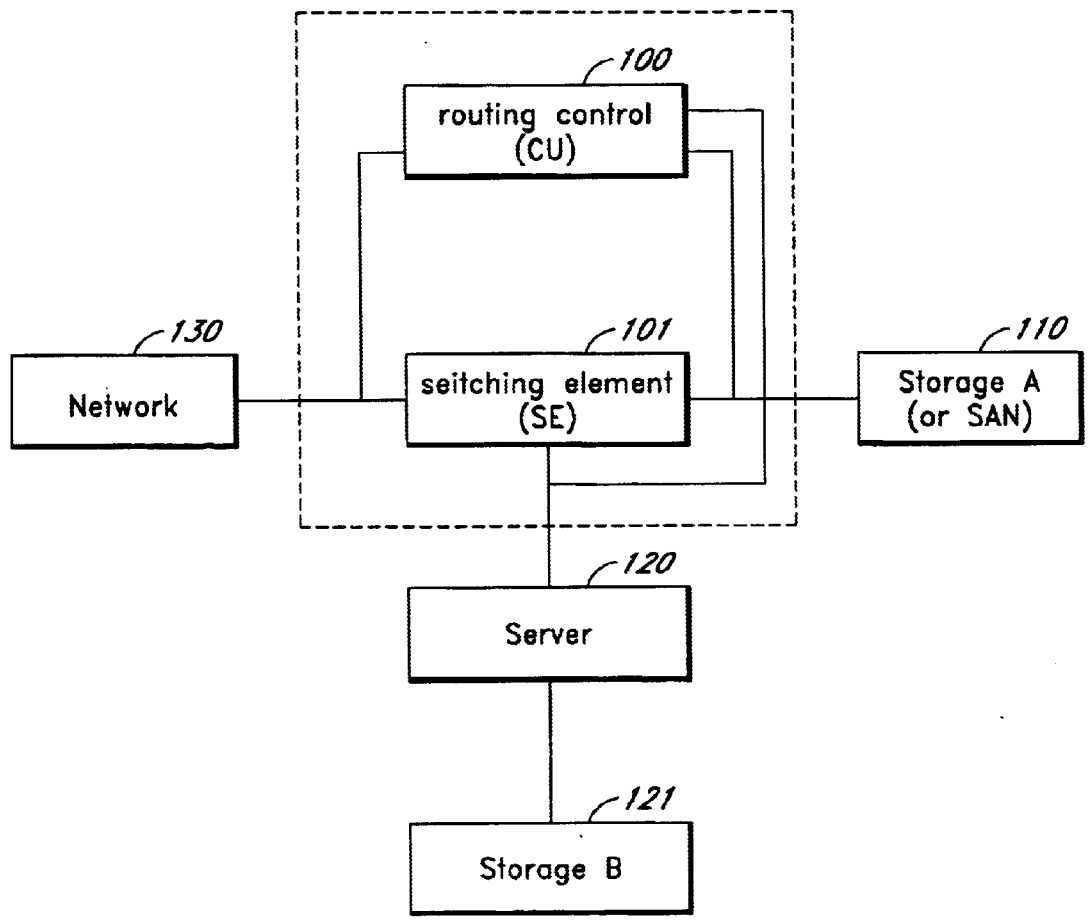
FIG. 1 is top-level diagram for the relation between the device and server and storage.
Figure 2:
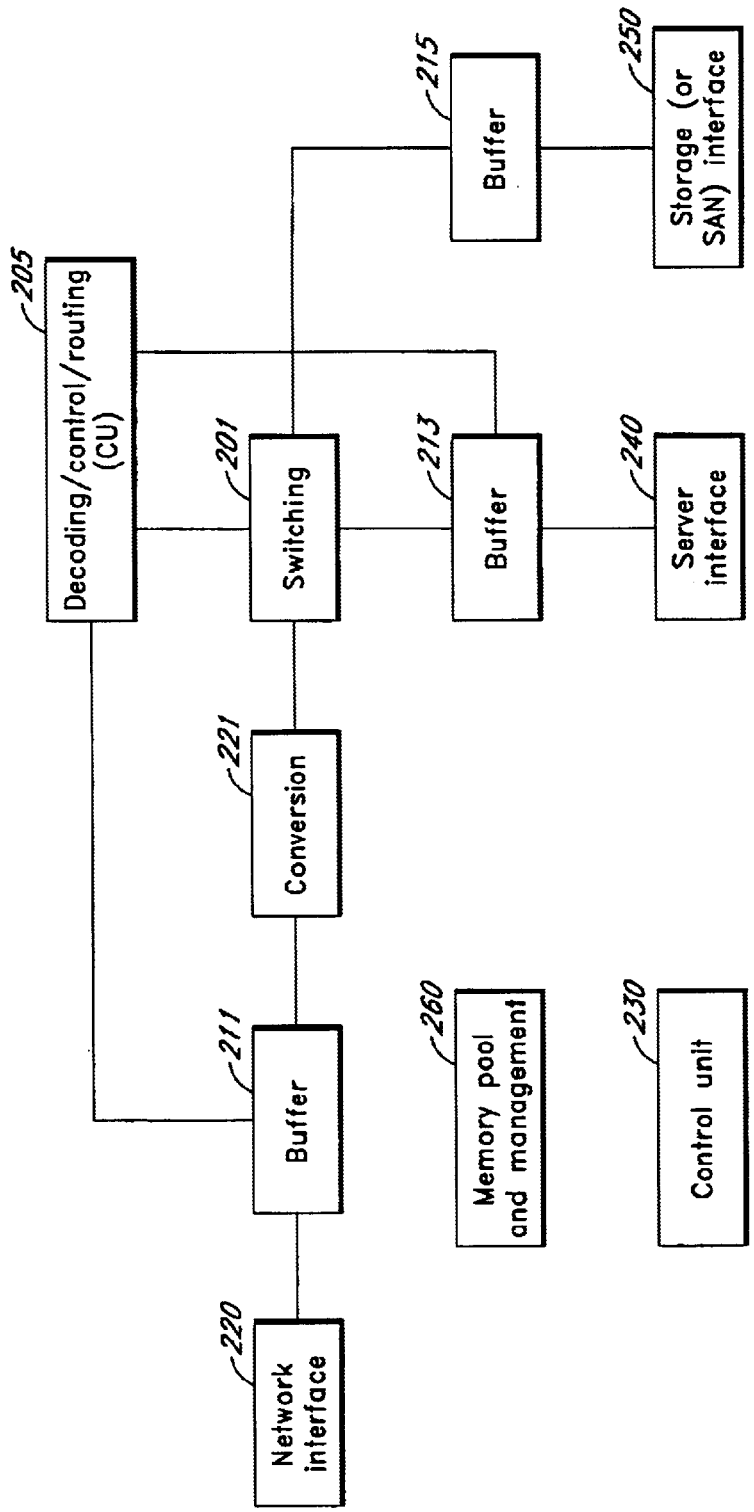
FIG. 2 is general function blocks inside the device with three logical interfaces, namely network, server and storage.

In one embodiment, a three-way network server bypass device has two main function blocks (100 and 101) as shown in FIG. 1. Based-on decoded high layer protocol information, the control unit, CU (100) decides to switch the data to the server or to the storage through switching element (SE, 101). The device may be physically inside the server housing, but may also be supplied as an external unit.

The present invention improves performance and reliability of network data access with the flexibility of a server-based system. It avoids multiple data-copying in a server system. The invention lets the majority of traffic bypass the server system bus, operating system (OS) and CPU or any other involvement with the server. It can also support quality of service (QoS) like prioritized traffic streams for real-time applications with video and audio, with bounded delay. Lastly, in a multiple-server system, it can provide load balancing and flow control combining with the CPU/bus/OS bypassing to optimize the overall system performance and improve fault-tolerance.

The above-mentioned improvements are achieved by decoding high-layer protocol(s) in real-time and using the information to direct the traffic flow between network interfaces, storage system (or SAN), and server(s), Depending on the nature of the application (in part or in whole), the traffic can be categorized as server-oriented, which will be sent to server system, or storage-oriented (data retrieving), which will be transferred between the network and storage directly without the servers (CPU, OS and Bus) involvement. As Internet and web applications become more prevalent, the resulting ever increasing traffic will tend to be storage-oriented. The invention dynamically identifies such traffic as storage-oriented and allows such traffic to bypass server (bus, OS and CPU).

The example application presented describes a single packet or a stream of packets with a particular purpose (e.g. user request for a web page.) Therefore, such a request-reply pair session may consist of several sub-applications. For instance, a user-initiated request may have to go through log-in and authorization processes that should be handled by server(s). This is a server-oriented process. But after a request is authorized, the transfer of data from the storage to the user can bypass the server and be sent directly to the user through the network interface; it is storage-oriented. Furthermore, the log-in and authorization can be a different type of application from the main session. For example, a request may not be real-time in nature, while the data transfer could be an isochronous video or audio stream like the case of "video-on-demand."

Simplified examples of application categorizing include:
1. Authorized real-time data transfer between a network interface and a storage interface.
2. Authorized non-real-time data transfer between a network interface and a storage interface.
3. Server-oriented traffic. For example, a new request to access a web page or user log-in from the network or storage system control between the server and storage system.
4. All other traffic defaults to the server (e.g., local traffic between server and storage).

Traffic types (1) and (2) will be routed to respective network or storage interfaces (e.g. from storage to network or vice-versa.) while (3) and (4) will be sent to server(s). The decoding process is to look into necessary protocol (layers) and to categorize incoming traffic (from where and for what). Then, the decoded header information (IP address, port ID, sequence number, etc.) is used as an index to the routing table for a match. A matched entry means the direct connection between network and storage has been "authorized."

Exemplary decoded header information is shown in FIG. 6. For example, the http header is in the payload of TCP, which in turn is in the IP packet. The decoding process is to look into the http headers for the nature of data (GET, POST, DELETE, etc, and maybe application payload length.)

The data content then is divided into segments of integral multiples of a fixed base, a process that we call "base-multiple segmentation" (BMS) technology. For example, a base of y bytes, say 2 Kbytes, is chosen, and all data streams or files are segmented into chunks of integral multiples of 2 Kbytes, like 2, 4, or 8 Kbytes (padding it for the last chunk if it is not an exact integral multiple of 2 Kbytes), with an upper limit of, say, 40 Kbytes (20 times y). The maximum size is chosen based-on the requirement of isochronous real-time traffic and the switching speed, such that it will still meet the tightest real-time needs while the switching element serves the largest segments. The advantages of BMS are that it is easier to pipeline multiple data streams or files yet still has the flexibility of variable segment size, which reduces overhead (in setup and headers) and improves performance of the device. The BMS technique described above can be used to advantage not only with the apparatus of the preferred embodiment, but in general data switching applications as well.

Once the nature of the traffic is determined, by consulting the Expanded Routing Table (ERT) (with more information than a regular routing table), as shown in FIG. 7, a proper switching path can be selected to forward the traffic with proper QoS measurement. For instance, higher priority traffic can be given more bandwidth and/or lower delay. The forwarded traffic to the network will then be processed with the proper protocol format conversion for transmission with all the necessary error checking and/or correction.

Figure 8:
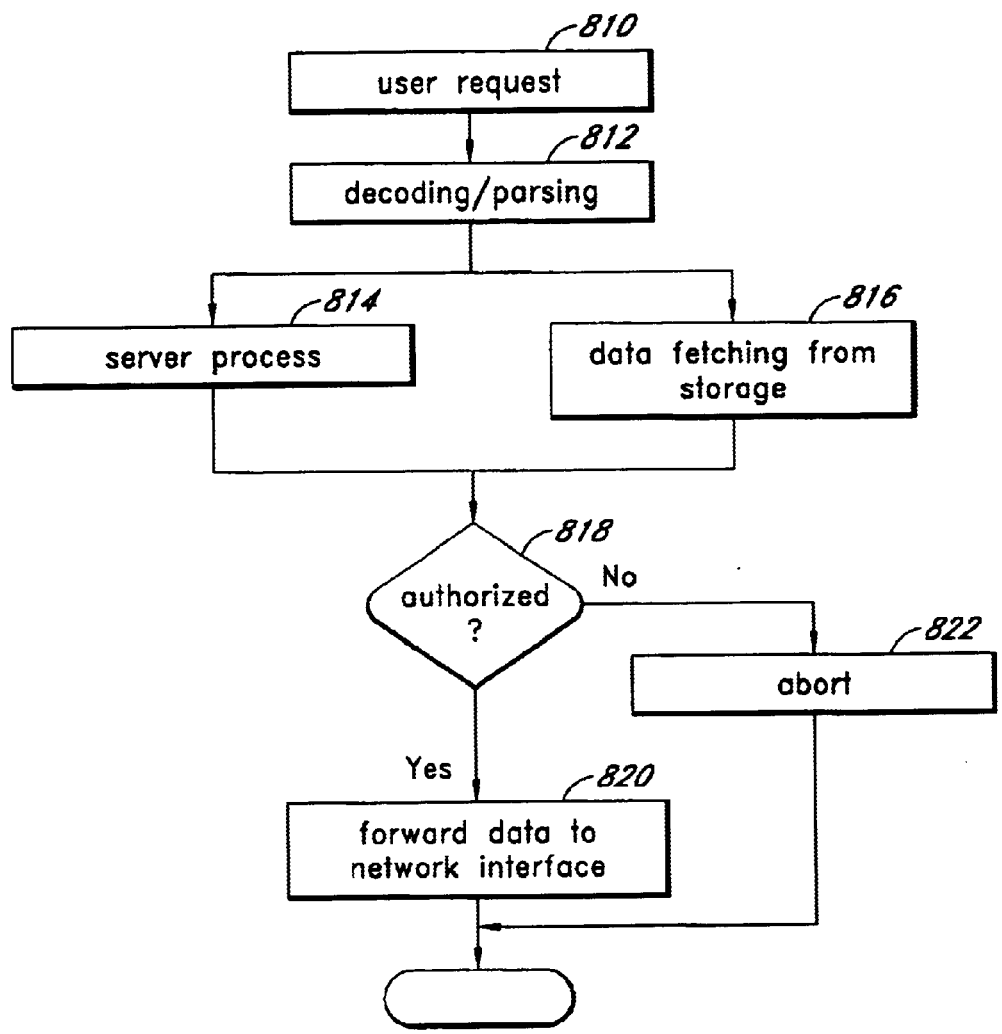
FIG. 8 is an example of pipelining process to maximize the performance.

A synchronization scheme is employed to interlock the decoding and switching processes. Multiple incoming data streams are queued for decoding and parsing (e.g. at application layer with http) to decided which path to forward the data. Synchronization is necessary between different phases of a request-reply session. For example, a reply to a request from a network user must be forwarded to the user after the authorization (or log-in) process. While the server is running the authorization process, the storage data fetching can be handled concurrently to speed up the process. By the time a request is granted, the data may be ready or getting ready for transmission; otherwise, if it is denied, the transmission is aborted. These concurrently pipelined processes are illustrated in FIG. 8.

The invention uses a high-layer or cross-layered (cross protocol layers) switching architecture, because the traffic pattern is significantly influenced by the upper layer applications while the transport unit or packet format is mostly determined by the low layer protocols. For instance, web applications determine the size and nature of the transfer (e.g. text-only, still pictures and/or video clips) in the headers of application layer. Low layer protocols decide the size(s) of the packets at various network or system segments and the way to handle them (e.g. fixed size packet vs. variable size, packet size, delay tolerance and flow control methods such as window-based flow control). By using upper layer information to help direct the low layer storage data transport, the benefits can be significant. For example, for streaming applications, data transport is streamed instead of switched packet-by-packet, thus achieving higher throughput).

In networking, end-to-end user experience depends on the network bandwidth (transport), server response time and storage access time. Among these factors, server congestion and the associated cost to handle the evergrowing network traffic are the major concerns and uncertainties for delivering QoS. By doing real-time high layer protocol decoding and parsing, and switching the majority of traffic to bypass the server with delay bound, the overall system performance and QoS can be improved greatly.

Functional Description of Main Components
Switching Element:

The switching element provides a data path for three-way switching (although it can have more than three physical connections) to and from the network, storage and server function units (CPU), through their respective interfaces with bounded delay. The switching element may be a fully-connected crossbar, memory-based switching, shared medium or other switching construct. The switching element has the capability of switching data traffic between any two (or more) of the interconnected interfaces. It is controlled by the control unit (CU) through a routing table that is set by server and on-board control based-on user request information.

Figure 3:
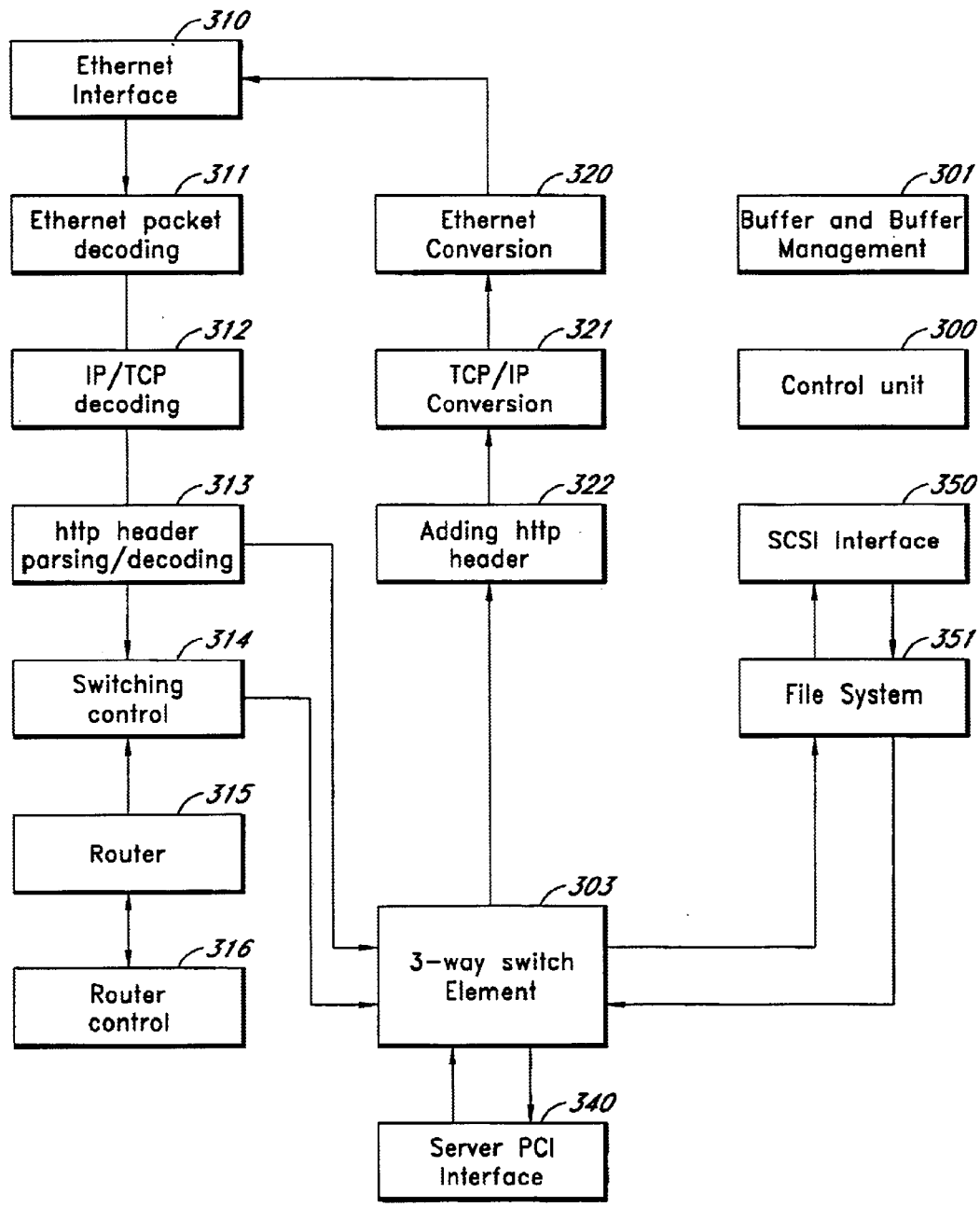
FIG. 3 gives an example of major detailed functions performed to achieve claimed improvements.

Decoding and Control Unit (CU):
Decoding:

Based-on the targeted protocol layer(s), the decoding block(s) will look into parts of the packet payload to parse higher layer header and/or content information to be used in making routing decisions in real-time. The information will be compared with a routing table entry for a potential match. The purpose of using higher protocol layer information is to direct and optimize the traffic flow (throughput, utilization, delay, losses, etc.) for performance and reliability improvement. In FIG. 3, only an http/html application is given as an example. Other applications like ftp and RTSP/RTP can also be implemented.

Control:

Based on the decoded information and the routing table content, a control signal is sent to the switching element (SE). The SE will set up a circuitry moving the data or packet(s) to the proper outgoing interface(s) through the switching element. Data or packets can be moved either individually and/or in batch (streaming), depending on the relations among them. It also controls routing table update, format conversions (which format to use) and other housekeeping tasks.

Scheduler and Flow Control:

While multiple concurrent streams waiting to be routed, the scheduler decides the order of execution based-on the priority and QoS information in the routing table. Some flow control mechanisms can also be exercised for the network interface and/or storage interface for further improvement of performance.

Router:

The router keeps a routing table, switching status and history and certain statistics, and controls the path traversed by the packets. The content in the routing table is provided by the server, based on storage controller (or SAN interface), and/or decoded packet information.

The switching and routing elements may be of a predetermined latency, and the routing table may include routing information (which port to route), the priority, delay, sensitivity and nature of the applications, and other contents for QoS measurement.

Buffering, Format Conversion and Medium Interfaces:

Buffering:

Basically, there are two kinds of buffers in the device. One is to buffer two asynchronized parts between the network, storage and server interfaces. The other serves as a waiting space for decoding higher layer protocols. In other words, the latter is to synchronize the decoding process and the switching process. The decoding time is pre-determined by design, so that the buffer size requirement can be calculated. A common pool of memory may be shared to save memory. This requires buffer management to dynamically allocate the memory for all pending threads/sessions.

Format Conversions:

There are several formats with respect to different interfaces and layers of protocols. These decodings and conversions have to be done in the device and involve multiple protocol layers. Examples of decoding and format conversions are http, RTSP, ftp, IP/TCP/UDP, Ethernet, SCSI, Fibre Channel, and/or PCI interfaces.

Medium Interfaces:

In this description, there are three types of logical medium interfaces: the network, storage and server(s). In actual implementation, various physical interfaces are possible, e.g., multiple network interfaces or storage interfaces or multiple servers. Buffers are used to synchronize transmission between interfaces. An example of implementation may be Ethernet, ATM or SONET for network interface, SCSI, Fibre Channel, PCI, InfiniBand, or other system I/O technology.

There may also be a speed matching function between the network and storage, load balancing functions for servers, and flow control for priority and QoS purposes. Such speed matching function may be effectuated through buffering. Such load balancing may be executed between or among any homogeneous interfaces in the device, and is effected based on message exchange comprising feedback information from the targeted device or other means well known in the art.

Description/Example:

FIG. 3 describes an implementation with Ethernet interface (310) for networking, PCI (340) for server and SCSI (350) for storage.

Figure 5:
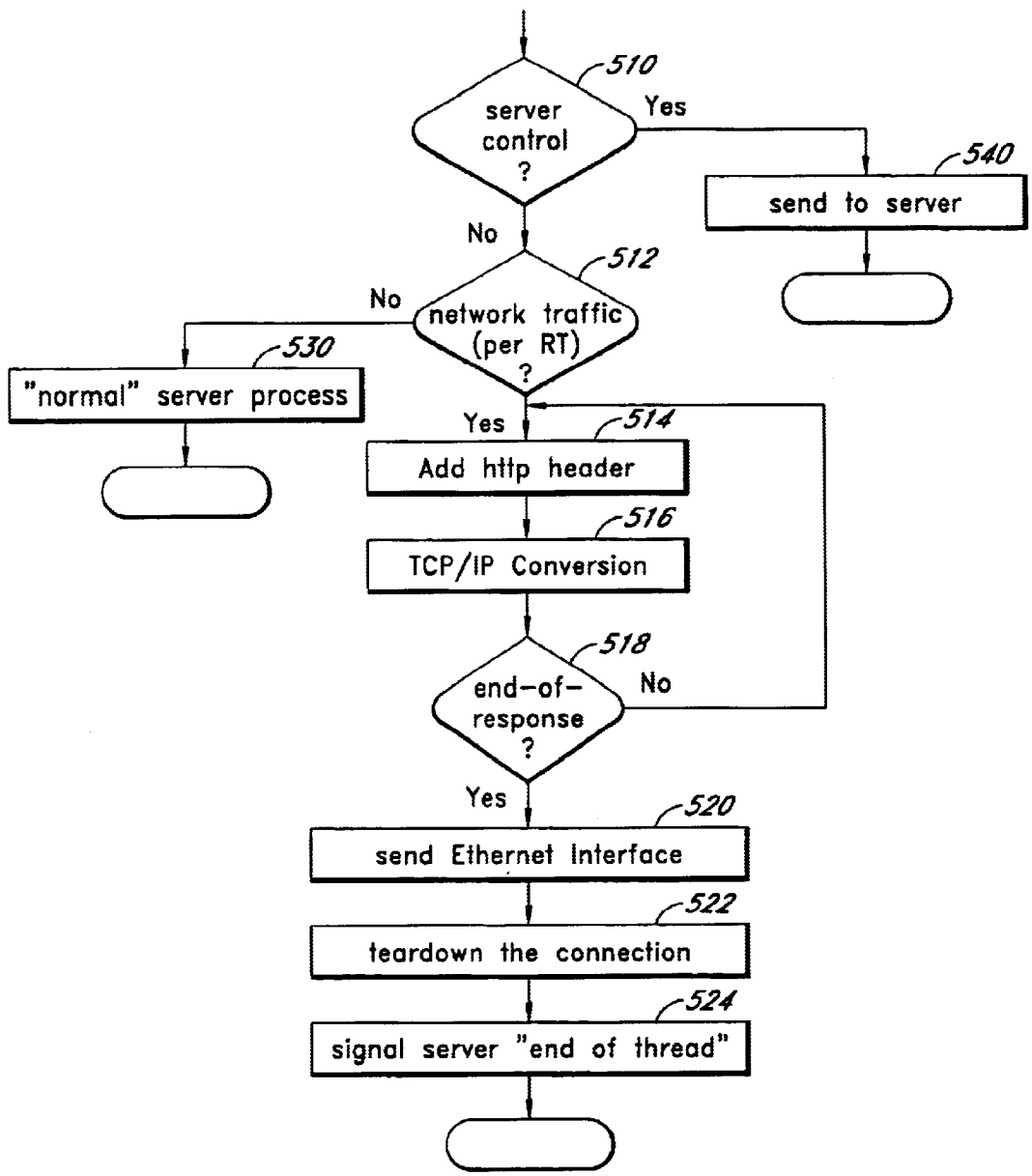

Storage to Network Traffic Bypass:

An incoming user/client request is received from Ethernet interface (310) and decoded at different layers from the Ethernet format (311) and IP/TCP (312) format. Then http header is parsed against the Expanded Routing Table residing in the Router (313, 314 and 315). If a match is found, the subsequent data (until the end of the http payload; perhaps an html file) will be forwarded per the router; otherwise, the http payload will be sent to the server for further processing (the default route). A routing table match indicates an established (authorized) connection. For example, if the data is sent to storage, it may be an authorized WRITE to the storage. The data routed to the server can either be an initial request for access or server-oriented traffic. The server may process the request with a log-in (if applicable) using an authentication, authorization, and accounting (AM) process. The software on the server will communicate with the device for all necessary setup (e.g. routing table and file system for the storage) through the Router Control (316) and Scheduler (in 315) and then pass the control to the device and notify the storage to start a response to that request with a given file ID (or name) for the file system (351) through the control path. The file system (351) then can issue commands to SCSI Interface (350) to fetch the data. When the response data in html format comes back from storage, it will be correlated to an established connection in the ERT (315) for proper path (314). Then an http header will be added (322). TCP/IP protocol conversion is carried out on the device (321 and 320). Finally. the data will be packed in Ethernet packets and sent out through the Ethernet Interface (310). The transfer from the storage to the network through the device for this connection will continue until it is completed or the device is notified by the server or storage to stop sending under certain events (e.g. error or user jumping to another web page). A pool of memory is used to dynamically control the traffic and buffer asynchronous flows. Control Unit (300) coordinates all the activities. FIG. 5 shows the flow chart of the data flow.

Higher layer traffic information (e.g. http or even html) is used to optimize the performance. For instance, a single initial web access request from the network is forwarded to the server. Once the server decides the access is legitimate, it sets up both the CU and storage control (or through the CU). Subsequent traffic (responses) will bypass the server and be directly forwarded to the network interface for further transfer. But a new request from a user will be directed to server for processing. This may include the case of accessing a new web page or area or from different applications (windows). Also, based on the nature of traffic (html vs. real-time video clip for example), differentiated services can be provided. Further, streaming based on the content can improve even non-real-time applications.

The default traffic path is through the server(s). For cases like initial user login, storage access error, or interrupted web page access, the server(s) would take over the control. Signaling is used to communicate between the server and the device. For the majority of data transfer, however, the server(s) is not in the data path so bus contention, OS involvement (interrupt) and CPU loading are significantly reduced. The traffic reduction through the server is very significant while the flexibility of having server(s) handling unusual cases is maintained in the design, as contrasted with the NAS approach.

Network to Storage Traffic Bypass:

The device is bidirectional. To write to storage, once granted access, the server sets up the router (315) mechanism and the subsequent incoming traffic from network for the same session will bypass the server through the decoding processes ((310, 311, 312, and 313). The decoded high layer information is parsed against the routing table (in 315). Proper connection to either server or storage can then be established by the Switching Element (303). If it is through the server, the data will go through the server bus and the OS for proper processing. Otherwise, a direct connection will be set up to route data (say, html files) to storage through the file system (351) (to handle file format), drivers (to handle storage controller interface, e.g. SCSI) and storage controller. The traffic through server and through SE is synchronized by the Scheduler (31*b*) and Memory Pool (301) before it is sent to SCSI Interface (350). This process is shown in FIG. 4.

Figure 4:
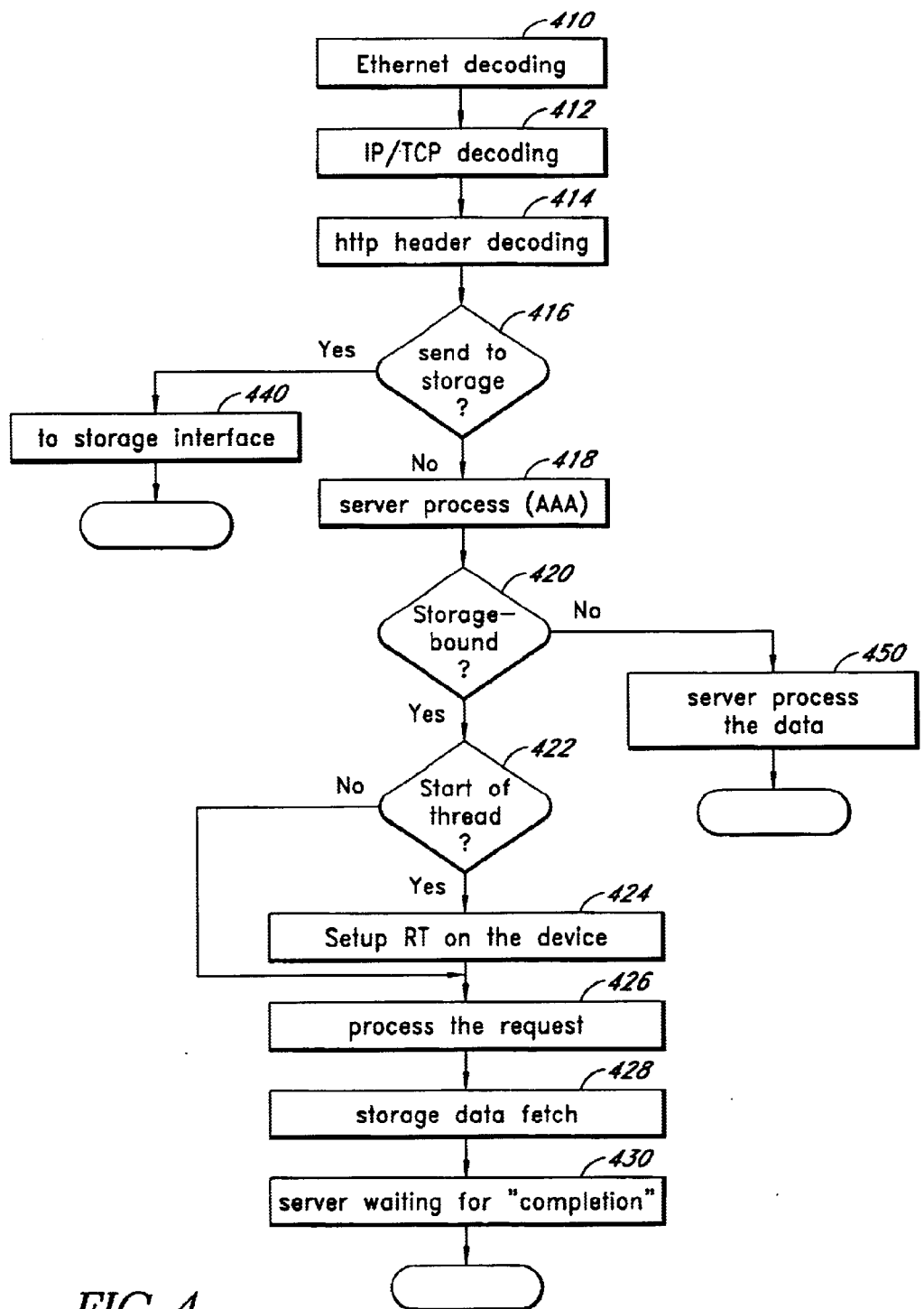
FIGS. 4 and 5 are flow charts for data flow from network to storage or vice-versa.

In both of the traffic directions, the storage and the network interfaces will carry out the proper protocol and format conversions with necessary buffering as shown in FIGS. 4 and 5.

Other Features:

Because the decoding time and switching time can be pre-determined, the delay for a packet going through the device is bounded. Further, for the same reason, the potential loss of packets can be reduced. A priority mechanism can be implemented to support different QoS requirements in the Router and Scheduler (315 and 300). In the case of multiple servers and/or storage and network devices, a load balancing and flow control mechanism can be applied based-on application tasks.

The server's role is supervisory, and is not involved in the byte-by-byte transfer. The CPU, operating system and server bus(es) are not in the normal path of the data transfer in either direction (from network to storage or from storage to network.) This invention represents a change from interrupt-based server and OS to switching-based networking architecture.

Performance improvements provided by the invention include:

1. Higher throughput: a significant (or majority) portion of traffic will directly go through the switching device, so data throughput can be dramatically improved while the server bus and operating system (OS) are bypassed.
2. Less delay: the server and bus contention and OS interrupt handling are out of the data path, through the switching element.
3. Real-time applications: bounded latency guarantees real-time applications due to the switching nature of the design.
4. Better reliability: less traffic going through server means less potential for server caused packet loss and malfunctions (server crashes). With added traffic control mechanism in the device, a shield can be implemented to protect server(s) from overloading and potential malfunctions.
5. Flexibility and versatility: due to the architecture, the device is still very flexible by having server-oriented or computation intensive services immediately available to the applications, e.g. authorizing, security check, data mining, and data synchronization.
6. Priority of services: higher layer(s) information can be used to help to prioritize services in the device. Reduced server loading should further improve the QoS to high priority and regular traffic.
7. Scalability: multiple devices can be used within a single server or a single device among multiple servers to support large-scale applications.

The type of server(s), operating system(s), network(s), storage system(s) or the speeds of the networks are not essential to the invention. Various interfaces can be designed. The three-way switching is a logical concept. In an actual implementation, the system can involve multiple networks and/or storage networks, e.g. a four-way switching among an ATM, Ethernet and storage area network (SAN) interfaces. The basic idea is a high layer or cross-(protocol) layered switching mechanism among heterogeneous (network) systems with embedded real-time protocol conversion to bypass the server(s) as much as possible. In addition, if multiple servers are involved, a load balancing scheme can improve the overall system performance further.

It is apparent from the foregoing that the present invention achieves the specified objectives of higher levels of RAS and throughput between the network and storage system, while retaining the security, flexibility, and services normally associated with server-based systems, as well as the other objectives outlined herein. While the currently preferred embodiment of the invention has been described in detail, it will be apparent to those skilled in the art that the principles of the invention are readily adaptable to implementations, system configurations and protocols other than those mentioned herein without departing from the scope and spirit of the invention, as defined in the following claims.

I claim:

1. An apparatus for interconnecting at least one data network, at least one storage device, and at least one server, comprising:

a network interface;

a storage interface;

a server interface; wherein said network interface, said storage interface, and said server interface are within a housing;

wherein said apparatus can transfer data between at least two of at least one data network, said at least one storage device and at least one server;

wherein said at least one server may be bypassed in serving said data to or receiving said data from said at least one data network, further comprising a control unit, which routes based at least in part on a routing table, said data coming into or being served from said at least one data network either to or from said at least one storage device or to or from said at least one server; and a high-level protocol decoding unit which decodes high layer application information, wherein said decoded high layer application information is used by said control unit to direct and control said data in real time.

2. The apparatus as described in claim 1, further comprising means for speed matching between said interfaces.

3. The apparatus as described in claim 1, further comprising a speed matching manager configured to perform speed matching between said network interface, said storage interface, or said server interface.

4. The apparatus as described in claim 1, further comprising means for load balancing among said interfaces which are homogeneous.

5. The apparatus as described in claim 1, further comprising a load balancing manager configured to perform load balancing among said network interface, said storage interface, or said server interface, which are homogeneous.

6. A method of using the apparatus as described in claim 1 comprising concurrently fetching pipelined data from said at least one storage device, and performing request processes by said at least one server in order to further accelerate network data access speed.

7. A method of using the apparatus as described in claim 1 comprising:

decoding multiple path high layer protocols;

packaging said data into segments;

switching said data to said network interface, said storage interface, or said server interface; and employing synchronization to interlock said decoding and switching.

8. A method of using the apparatus as described in claim 1 comprising employing base multiple segmentation (BMS), whereby said data is subdivided into segments which are each an internal multiple of a fixed base segment size.

9. An apparatus for interconnecting at least one data network, at least one storage device, and at least one server, comprising:

a network interface;

a storage interface;

a server interface, wherein said network interface, said storage interface, and said server interface are within a housing;

wherein said apparatus can transfer data between at least two of at least one data network, at least one storage device and at least one server; wherein said at least one server may be bypassed in serving said data to or receiving said data from said at least one data network, further comprising a control unit, which routes based at least in part on a routing table, said data coming into or being served from said at least one data network either to or from said at least one storage device or to or from said at least one server; and a high-level protocol decoding unit which decodes high layer application information, wherein said decoded high layer application information is used by said control unit to forward said data with flow control and quality of service (QOS) measure.

10. The apparatus as described in claim 9, further comprising means for speed matching between said interfaces.

11. The apparatus as described in claim 9, further comprising a speed matching manager configured to perform speed matching between said network interface, said storage interface, or said server interface.

12. The apparatus as described in claim 9, further comprising means for load balancing among said interfaces which are homogeneous.

13. The apparatus as described in claim 9, further comprising a load balancing manager configured to perform load balancing among said network interface, said storage interface, or said server interface, which are homogeneous.

14. A method of using the apparatus as described in claim 9 comprising concurrently fetching pipelined data from said at least one storage device, and performing request processes by said at least one server in order to further accelerate network data access speed.

15. A method of using the apparatus as described in claim 9 comprising:

decoding multiple path high layer protocols;

packaging said data into segments;

switching said data to said network interface, said storage interface, or said server interface; and employing synchronization to interlock said decoding and switching.

16. A method of using the apparatus as described in claim 9 comprising employing base multiple segmentation (BMS), whereby said data is subdivided into segments which are each an integral multiple of a fixed base segment size.

17. A method of using an apparatus for interconnecting at least one data network, at least one storage device, and at least one server, comprising:

providing a network interface;

providing a storage interface;

providing a server interface; wherein said network interface, said storage interface and said server interface are within a housing;

providing a routing element having a routing table;

transferring data between at least two of at least one data network, at least one storage device and at least one server, wherein said at least one server may be bypassed in serving said data to or receiving said data from said at least one data network;

providing a control unit in communication with said routing element, which routes said data coming into or being served from said at least one data network either to or from said at least one storage device or to or from said at least one server;

providing a high-level protocol decoding unit, wherein decoded high layer application information is used by said control unit to direct and control data traffic in real time;

decoding multiple path high layer protocols;

packaging said data into segments;

switching said data to said network interface, said storage interface, or said server interface; and employing synchronization to interlock said decoding and switching.

18. A method of using an apparatus for interconnecting at least one data network, at least one storage device, and at least one server, comprising:

providing a network interface;

providing a storage interface;

providing a server interface; wherein said network interface, said storage interface and said server interface are within a housing;

providing a routing element having a routing table;

transferring data between at least two of at least one data network, at least one storage device and at least one server; wherein said at least one server may be bypassed in serving said data to or receiving said data from said at least one data network;

providing a control unit in communication with said routing element, which routes said data coming into or being served from said at least one data network either to or from said at least one storage device or to or from said at least one server;

providing a high-level protocol decoding unit, wherein decoded high layer application information is used by said control unit to forward data traffic with flow control and quality of service;

decoding multiple path high layer protocols;

packaging said data into segments;

switching said data to said network interface, said storage interface, or said server interface; and employing synchronization to interlock said decoding and switching.

19. The apparatus of claim 1 wherein the housing is a server housing.

20. The apparatus of claim 1 wherein the housing is an external unit.

21. The apparatus of claim 9 wherein the housing is a server housing.

22. The apparatus of claim 9 wherein the housing is an external unit.

* * * * *